United States Patent [19]

France

[11] Patent Number: 4,601,315
[45] Date of Patent: Jul. 22, 1986

[54] TRASH BAG LOADING DEVICE FOR GARDEN CARTS AND THE LIKE

[76] Inventor: John W. France, P.O. Box 656, Rawlins, Wyo. 82301

[21] Appl. No.: 267,333

[22] Filed: May 26, 1981

[51] Int. Cl.[4] ................................................ B65B 1/06
[52] U.S. Cl. .................................... 141/231; 141/316; 248/98
[58] Field of Search ...................... 141/1, 10, 108, 109, 141/231, 313–317, 390, 391; 248/98, 99, 101

[56] References Cited

U.S. PATENT DOCUMENTS

| | | | |
|---|---|---|---|
| 225,202 | 3/1880 | Wylie | 68/237 |
| 423,743 | 3/1890 | Durler | 254/93 H |
| 430,355 | 6/1890 | Stone | 141/108 |
| 2,597,544 | 5/1952 | Swain | 280/15 |
| 3,095,073 | 6/1963 | Larson et al. | 193/33 |
| 3,254,817 | 6/1966 | Bartz | 294/142 |
| 3,875,981 | 4/1975 | Brenner | 141/231 X |
| 3,916,962 | 11/1975 | Stolt | 141/313 X |
| 3,950,004 | 4/1976 | Olsson | 280/47.18 |
| 4,238,868 | 12/1980 | Sternberg | 248/101 |
| 4,312,531 | 1/1982 | Cross | 248/99 X |

*Primary Examiner*—Stephen Marcus
*Assistant Examiner*—Mark Thronson
*Attorney, Agent, or Firm*—Wm. Griffith Edwards

[57] ABSTRACT

A device for holding a flexible trash bag is arranged for mounting on a garden cart of the type having parallel handle arms extending rearwardly from the top of the cart body. The device comprises a flat sheet having upstanding side walls and arranged to extend across the handle arms from adjacent the top of the cart. Bag holding structure is provided under the rear edge of the sheet and when the device is installed on a cart, grass cuttings or other refuse may be swept out of the cart and over the sheet into the bag; the bag may be kept open by holding it by hand against a cross member between the ends of the arms.

14 Claims, 4 Drawing Figures

TRASH BAG LOADING DEVICE FOR GARDEN CARTS AND THE LIKE

This invention relates to devices for facilitating the loading of trash bags with the contents of a garden cart or the like.

BACKGROUND, FIELD AND PRIOR ART

Garden carts having a body of scoop-like configuration mounted on two wheels and comprising two side walls and a curved bottom wall with a frame handle have come into general use for collecting and carrying trash or refuse such as grass cuttings, pulled weeds and leaves. It is also a common practice to use large plastic bags for carrying the trash and for facilitating the collection and removal thereof. The holding of the plastic bag for loading with the trash presents problems because the bags are highly flexible and are not self supporting and the bag must be held open for filling.

One arrangement for supporting a plastic bag for loading is disclosed in U.S. Letters Pat. No. 3,950,004 Olsson. The patent provides a bag support for a garden barrow which support acts as the rest for the barrow in one position and in the other provides a bag support when the barrow is placed on its end in an upright position.

It is a frequent practice to rake grass cuttings, leaves or other refuse material into piles and then to load the material into a garden cart for removal and bagging and disposal. It is desirable to provide an improved arrangement for facilitating the bagging of refuse and accordingly it is an object of my invention to provide an improved arrangement for holding a bag open at a garden cart and to load the bag from the cart.

It is another object of my invention to provide an improved device for holding a trash bag along one edge adjacent a cart and for providing a chute for loading from the cart.

The features of novelty which characterize my invention are pointed out with particularity in the claims annexed to and forming a part of this specification. My invention itself, however, both as to its organization and its manner of use together with further objects and advantages thereof may best be understood upon reference to the following description taken in connection with the accompanying drawing.

BRIEF DESCRIPTION OF THE DRAWING

In the accompanying drawing.

DESCRIPTION OF PREFERRED EMBODIMENT

Figure 1:
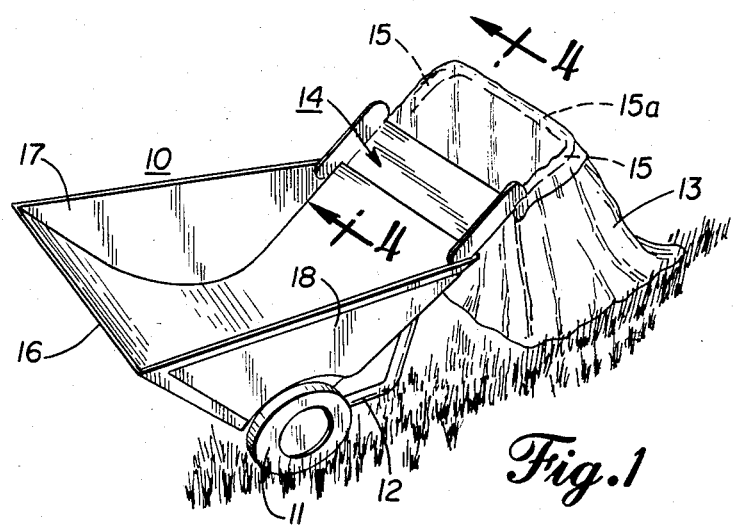
FIG. 1 is a perspective view of a garden cart provided with a bag loading device embodying my invention with a bag in position for loading.

Referring now to the drawings, FIG. 1 illustrates a garden cart 10 having wheels 11 and a cart rest or foot 12 positioned on the lawn with a plastic trash bag 13 suspended from the handle of the cart. The plastic bag is held by a device 14 which fits on the arms 15 of the cart in general alignment with the rear wall of the cart. The front edge of the bag 13 is secured to the device 14 and the remainder of the bag is shown wrapped over the handle of the cart. During filling of the bag the handle is held to hold the bag adjacent the cross bar and keep it open while the user sweeps trash from within the body of the cart 10 over the device 14 and into the bag.

The cart illustrated is of the type having a body 16 with a bottom wall which curves downwardly from the front edge and turns up toward the rear edge of the cart the upwardly sloping end walls being shown as substantially flat. The side walls indicated at 17 and 18 are generally flat and the handle arms 15 are formed as parts of a continuous bar or tube including the rest 12 and the base of the handle arms extending along the rear of the wall 16 of the cart and being welded or otherwise suitably secured thereto.

Figures 2, 3:
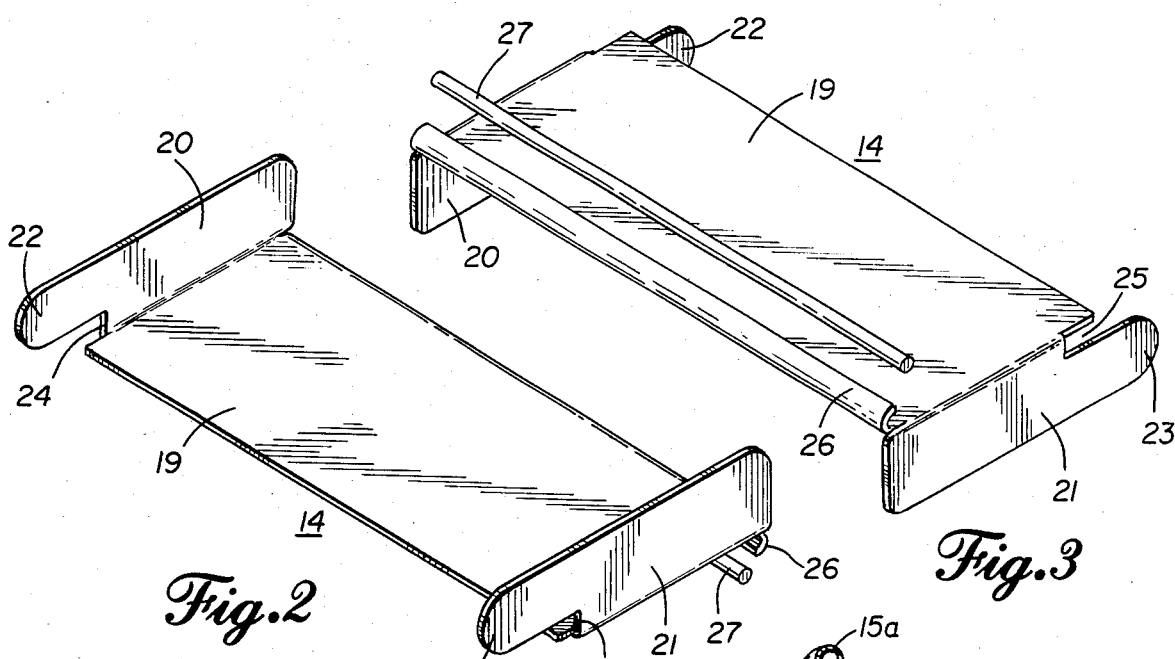
FIG. 2 is a top isometric view of the loading device of FIG. 1.
FIG. 3 is a bottom isometric view of the device.

The construction of the device 14 is shown in FIGS. 2 and 3. This device comprises a flat main sheet 19 and two upright wall members 20 and 21 which are bent portions of the sheets and which extend across the respective ends of the sheet 19. The wall members 20 and 21 are formed with a base portion which extends along the end of the sheet and terminates short of the front edge by an amount sufficient to form notches with reduced end portions 22 and 23, respectively, of the two end walls; these notches, indicated at 24 and 25, on the ends 20 and 21, respectively, are provided in order to prevent unintentional displacement of the device from its position on the end wall of the cart.

The device 14 is arranged to hold one edge of a plastic sack 13 indicated in FIG. 1. This arrangement includes a channel member 26 which is formed by bending the sheet 19 and extends along the under side of the rear end of the chute and faces toward the forward end. The curvature of the configuration of the channel 26 is such that a dowel stick or similar rod may be pressed into the channel with an edge of the bag between the rod and the channel and the rod will hold the bag in position. The channel also serves to reinforce the flat sheet.

Figure 4:
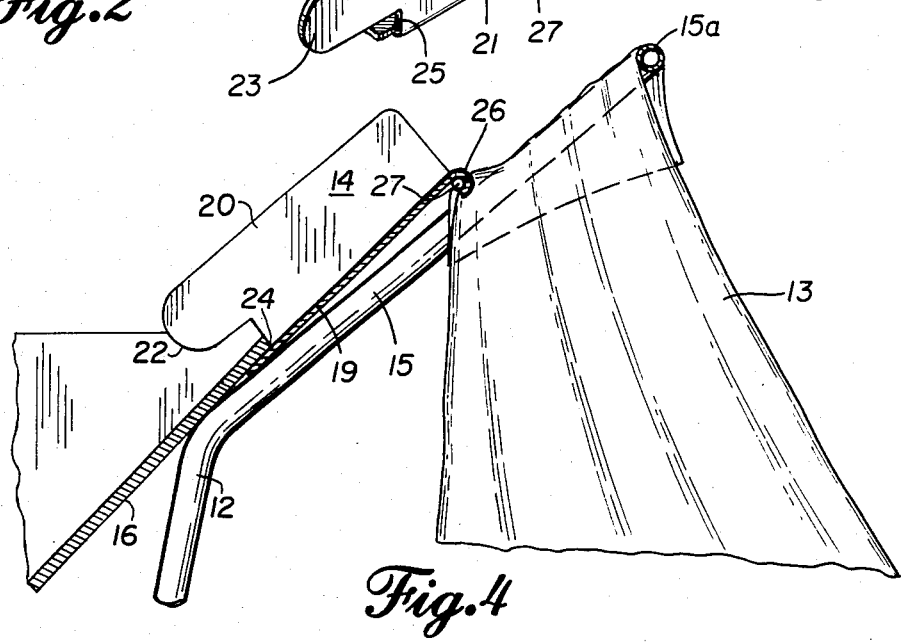
FIG. 4 is a sectional side elevation view along the line 4—4 of FIG. 1.

The manner in which the device 14 fits on the end wall of the cart is illustrated in FIG. 4 which is a sectional elevation view of the device 14 in place and holding the front edge of the bag 13.

The illustrated cart is provided with handles which are formed by bending the tubular member 12 to form the side arms 15 and the cross arm or handle 15a connecting the arms 15 at their outer ends. When the device 14 is placed in position against the rear edge of the cart the notches 24 and 25 fit on the edge of the rear wall, and the side walls 20 and 21 extend generally in alignment with the side walls 17 and 18; these side walls are provided to minimize spillage during the transfer of trash from the cart to the bag. The ends of the channel 26 rest on the arms 15 and support the sheet 19 in position to act as a chute between the body of the cart and the bag 13. In FIG. 4 the bag has been illustrated as wrapped over the arms and the rear handle 15a and usually during use the user will hold the bag in position on the handle 15a with one hand while the material from within the cart is scooped upwardly over the sheet 14 and into the bag 13 until the bag has been filled or all the material removed from the cart. The dowel stick or other rod indicated at 27 will maintain the front end of the bag securely in position during the filling operation. The sheet 19 is clearly shown in FIG. 4 is positioned with its front edge under the lip or edge of the rear of the wall 16 of the cart so that grass or leaves swept from the cart up the flat rear wall and over the sheet 19 pass easily over the edge of the cart and over the sheet and into the bag without loss of grass or other material.

The device 14 of my invention makes it easy to load material directly from the cart into the bag without loss of the material and without inconvenience to the operator. As soon as the cart has been filled with the grass or other refuse the bag may be filled therefrom or the cart may first by moved to a position where the bag is to be stored or otherwise disposed of and the bag may then be filled. Thus an arrangement is provided which makes it possible to use the cart and load it and fill the bag therefrom release and leave the filled bag then load the cart again and fill another bag and so on. The device avoids the difficulty of holding the mouth of the bag open when it is unsupported and at the same time provides a clear sweeping path for easy unloading of the cart and filling of the bag.

While my invention has been illustrated and described in connection with a specific form of cart various other modifications and different applications will occur to those skilled in the art, therefore, I do not desire that my invention be limited to the details illustrated and described and I intend by the appended claims to cover all modifications which fall within the spirit and scope of the invention.

I claim:

1. As an article of manufacture a guide device for use on and for facilitating the transfer of trash from a garden cart or barrow of the type having an open top body and spaced handle arms extending rearwardly from the rear end of the body adjacent the top thereof, said guide device comprising:

a flat generally rectangular rigid sheet member of a length to extend across and rest on the handle arms of the cart with the front edge of said sheet adjacent and under the rear wall of the cart, a forwardly opening straight channel member on the bottom of said sheet near the rear edge thereof, said channel being adapted to receive and closely hold a dowel stick or the like whereby an edge of a trash bag opening upwardly may be placed over a dowel stick and pressed therewith into the channel to secure the top of the bag to the sheet and whereby grass cuttings and similar trash may be swept by hand from the body of the cart over said sheet and into the bag.

2. The invention set forth in claim 1 including upwardly extending side walls at the ends of said sheet for minimizing lateral displacement of trash as it is swept over said sheet.

3. The invention set forth in claim 2 wherein said side walls when said sheet is positioned on a cart constitute extensions of the side walls of the cart.

4. The invention set forth in claim 2 including notches in said side walls adjacent the front edge of said sheet for extending about the top of the end wall of the cart for minimizing vertical displacement of the sheet during use.

5. The invention set forth in claim 1 wherein said channel is of generally circular cross section to conform to the cross sectional shape of a dowel stick.

6. The invention set forth in claim 1 wherein the cart includes a cross member connecting the outer ends of said handle arms whereby an open bag held along one edge by said channel and dowel stick may be held fully open by an operator by one hand gripping said cross member while sweeping trash from the cart into the bag with the other hand.

7. The invention set forth in claim 2 wherein said channel and said upwardly extending side walls are bent portions of said sheetmember.

8. As an article of manufacture for use on and for facilitating the transfer of trash from a garden cart or barrow of the type having an open top body and spaced handle arms extending rearwardly from the rear end of the body adjacent the top thereof and in general alignment with the rear wall of the cart, said guide device comprising:

a flat generally rectangular rigid sheet member of a length to extend across and rest on the handle arms of the cart with the front edge of said sheet adjacent the rear wall of the cart, means near the rear edge of said sheet for attaching the edge of a trash bag along the lower side of said sheet near the rear edge thereof, whereby material in the body may be swept by hand from the body of the cart over the rear wall and over said sheet into the bag.

9. The invention set forth in claim 8 including upwardly extending side walls at the ends of said sheet for minimizing lateral displacement of trash as it is swept over said sheet.

10. The invention set forth in claim 9 wherein said side walls when said sheet is positioned on a cart constitute extensions of the side walls of the cart.

11. The invention set forth in claim 10 including notches in said side walls adjacent said sheet for engaging the top of the rear end wall of the cart for positioning the front edge of said sheet under the rear end wall and for minimizing displacement vertically of the sheet during use.

12. The invention set forth in claim 8 wherein the cart includes a cross member connecting the outer ends of said arms whereby an open bag attached by said means along the lower side of said sheet may be held fully open by an operator by one hand gripping the opposite side of the bag and said cross member while sweeping trash from the cart into the bag with the other hand.

13. In combination with a garden cart having an open top body with side walls and an upwardly and rearwardly sloping rear wall and spaced handle arms extending rearwardly from said rear wall adjacent the top thereof, a guide device for facilitating the transfer of material from the cart to a bag, said guide device comprising:

a flat generally rectangular rigid sheet member of a length to extend across and rest on the handle arms of said cart with the front edge of said sheet adjacent and under the rear wall of said cart, means near the rear edge of said sheet for attaching one edge of an open trash bag along the lower side of said sheet, and means for preventing lateral and vertical displacement of the forward end of said sheet when in position on said cart, whereby material in said cart body may be swept by hand from the body over the rear wall and over said sheet into a bag attached to said sheet.

14. The combination of claim 13 wherein said means for preventing displacement includes upwardly extending side walls at the ends of said sheet and notches between the forward ends of said side walls and said sheet, said side walls being positioned to engage respective side walls of said body on lateral movement of said sheet and the front edge of said sheet being restrained from vertical movement when the rear wall of said cart lies within said notches, said side walls when in position on said cart constituting extensions of the side walls of said body.

* * * * *